United States Patent
Guthmann

(10) Patent No.: US 7,386,967 B2
(45) Date of Patent: Jun. 17, 2008

(54) ROUND BALER

(75) Inventor: Peter Guthmann, Metz (FR)

(73) Assignee: Usines Claas France S.A., St. Remy/Woippy (FR)

( * ) Notice: Subject to any disclaimer, the term of this patent is extended or adjusted under 35 U.S.C. 154(b) by 44 days.

(21) Appl. No.: 11/560,009

(22) Filed: Nov. 15, 2006

(65) Prior Publication Data

US 2007/0107377 A1     May 17, 2007

(30) Foreign Application Priority Data

Nov. 17, 2005   (DE) .................. 10 2005 055 375
Aug. 18, 2006   (DE) .................. 20 2006 012 674 U

(51) Int. Cl.
*B65B 11/04*     (2006.01)
(52) U.S. Cl. .................. 53/211; 53/118; 53/389.3; 53/587; 100/87; 100/100
(58) Field of Classification Search .................. 53/118, 53/211, 389.3, 587; 100/87–89, 100; 60/445, 60/327, 431, 328
See application file for complete search history.

(56) References Cited

U.S. PATENT DOCUMENTS 5,826,418 A     10/1998   Clostermeyer et al.

FOREIGN PATENT DOCUMENTS

DE          34 18 681      11/1985
DE          195 48 271     7/1997

*Primary Examiner*—Hemant M. Desai
(74) *Attorney, Agent, or Firm*—Michael J. Striker

(57) ABSTRACT

A round baler has a bale chamber, a movable flap for delivering a bale, a wrapping material dispenser for supplying wrapping material for wrapping a finished bale in the bale chamber, a knife movable from a ready position into a final position to separate a continuous web of the wrapping material between the dispenser and the bale chamber and which, coupled to an actuation of the flap, is returnable to the ready position, separate actuating elements assigned to the knife and to the flap, a common drive energy source, a line connecting actuating elements to the common drive energy source, and an interrupter located on the line, wherein the drive energy source and the actuating element of the knife are located on one side of the interrupter, while the actuating element for the flap is located on another side of the interrupter.

7 Claims, 2 Drawing Sheets

ROUND BALER

CROSS-REFERENCE TO A RELATED APPLICATION

The invention described and claimed hereinbelow is also described in German Patent Application DE 10 2005 055 375.3 filed on Nov. 17, 2005. This German Patent Application, whose subject matter is incorporated here by reference, provides the basis for a claim of priority of invention under 35 U.S.C. 119(a)-(d).

BACKGROUND OF THE INVENTION

The present invention relates generally to a round baler for crop material.

More particularly, the present invention relates to a round baler for crop material, with a bale chamber which includes a movable flap for delivering a bale formed out of the crop material in the bale chamber, with a wrapping material dispenser for supplying a wrapping material web for wrapping a finished bale in the bale chamber, and a knife, which is movable from a "ready" position into a final position to separate a continuous web of the filling material between the dispenser and the bale chamber, thereby enabling the wrapped bale to be delivered out of the baler. A round baler of this type is known, e.g., from DE 3418681.

DE 195 482 71 A1 describes a round baler with a housing which can be swung open to eject a finished bale; an actuating element in the form of a hydraulic piston cylinder unit is provided to drive the swiveling motion.

It is possible to eliminate a separate actuating element for moving the knife by coupling its return motions to the "ready" position—in which it is ready to separate the wrapping material webs—to the opening and/or closing motion of the flap. This is an economical solution, provided the wrapping procedure functions properly If problems arise with the wrapping of the bales, however, e.g., because the wrapping material was wrapped around a roller instead of the bales, or the wrapping is not tight enough to hold the bales together, it can be necessary to trigger a second cutting procedure without being able to first eject the bale.

This means the flap must remain closed, and the coupling of the knife reset position to the swivelling motion cannot be used to return the knife to the "ready" position. A user must therefore manually access the knife to move it back into the "ready" position. Since the bale chamber cannot be swung open without the bale material falling out, it is difficult to access the knife, and there is a risk that the operator will become injured in the attempt to reset the knife.

SUMMARY OF THE INVENTION

Accordingly, it is an object of the present invention to provide around baler which avoids the disadvantages of the prior art.

More particularly, it is an object of the present invention, therefore, is to provide a round baler of the type described initially, with which the knife can be easily returned to the "ready" position without the need to open the bale delivery flap, and without risk of injury to an operator.

The object is attained by the fact that separate actuating elements are assigned to the knife and the flap; the two actuating elements are connected to a common drive energy source via a line, an interrupter is located in the line, and the drive energy source and the actuating element of the knife are located on one side of the interrupter, and the actuating element of the flap is located on another side of the interrupter. Depending on the state of the interrupter, it is therefore possible—by applying drive energy to the line—to either only reset the knife or to open the flap and eject the finished bale simultaneously with the resetting of the knife.

The line is preferably a hydraulic line, and the interrupter is preferably a directional control valve.

Advantageously, the actuating element of the knife should be drivable—via application of drive energy—in two opposite directions, the knife being driven by a motion of the actuator in a first of the two directions into the "ready" position.

The actuator can also serve to drive the knife into the second, opposite direction, i.e., to drive the cutting motion of the knife. When the line is a hydraulic line in particular, to drive the cutting motion, it is preferable, however, to provide an energy accumulator such as a spring, which can provide the kinetic energy of the knife required to separate the continuous web in a shorter period of time.

Particularly in a case such as this, it is preferable to move the actuating element in the second direction while the knife is in the "ready" position, so that the actuating element does not hinder the cutting motion of the knife.

A detent element such as a pawl or the like can be provided to detachably lock the knife in the "ready" position.

The interrupter is preferably remote-controlled by a signal supplied to the round baler from the outside. This makes it possible for, e.g., the driver of a tractor to which the round baler is coupled, to trigger the return motion of the knife from the driver's seat.

Further features and advantages of the present invention become clear with the description of exemplary embodiments below, with reference to the attached figures.

DESCRIPTION OF THE PREFERRED EMBODIMENTS

Figure 1:
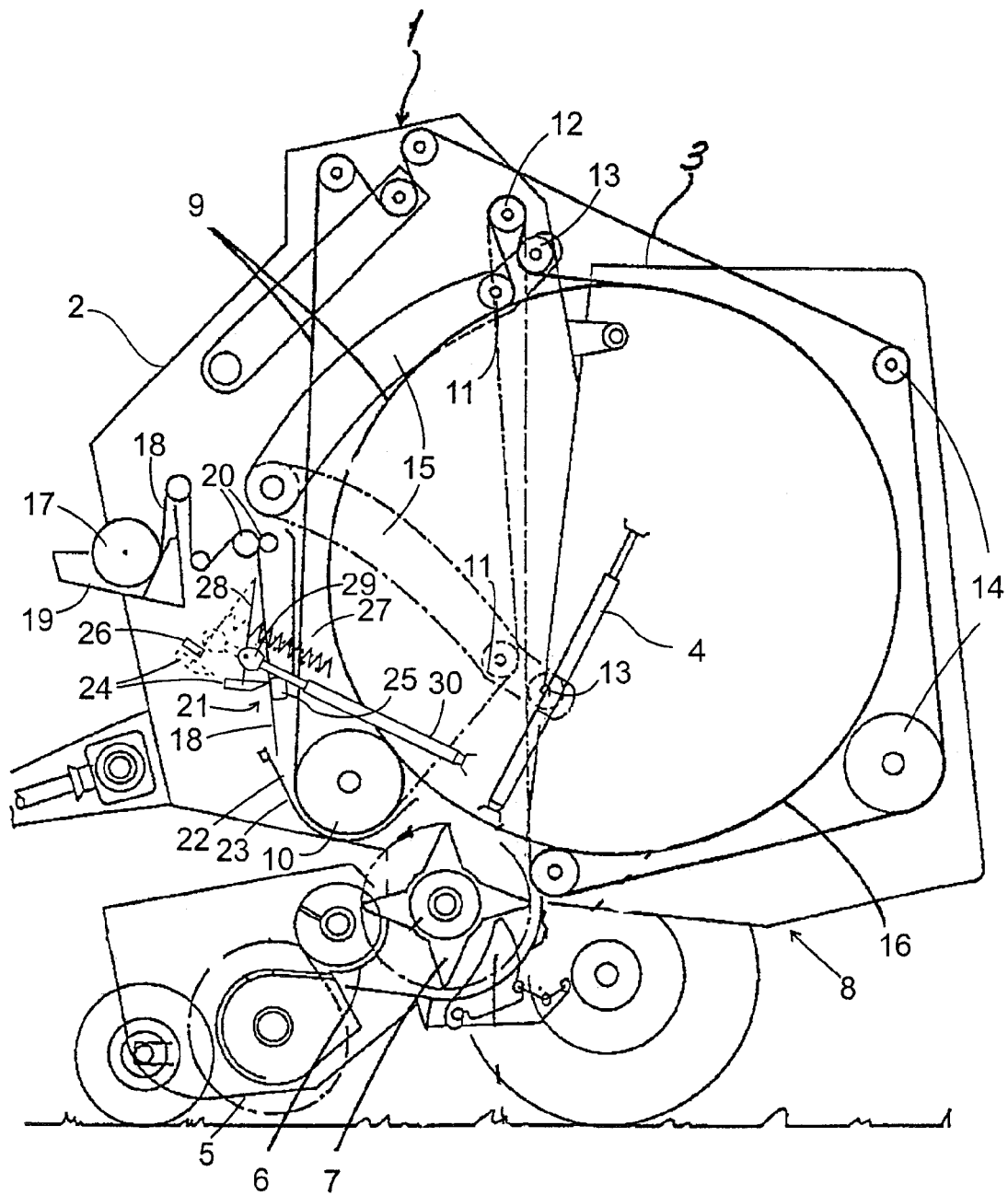
FIG. 1 shows the inventive round baler in a schematic side view.

A round baler is labeled 1; it includes a fixed housing part 2, and housing part 3, which can be swung open. A piston cylinder unit 4 for driving a swivelling motion of the rear, movable housing part 3 is located on each side of the housing, and is hingedly connected with both housing parts 2, 3.

A pick-up device 5 known per se serves to pick up crop material to be baled from the ground and to feed the crop material into a feed channel 6, from where it travels via a header 7 into a bale chamber 8 inside the housing of baler 1. Bale chamber 8 is bounded by an endless belt 9, which circulates on rollers 10, 11, 12, 13, 14. Rollers 11, 13 are mounted on a pivotable arm 15 and, over the course of a baling procedure, move out of their position indicated in the figure with a dash-dotted line into the position indicated with a solid line to the extent by which the circumference of bale 16 being formed in the chamber increases.

A supply roller 17 for a material web 18, e.g., of plastic film or a woven material, for wrapping bale 16 is accommodated in a trough 19 on the front—relative to the driving direction—side of fixed housing part 2. From there, material web 18 is guided via rollers 20 and a cutting gap 21 to a feed funnel 22, which is bounded on one side by endless belt 9 running around roller 10, and, on the other, by a guide plate 23 guided around roller 10. When bale 16 has reached the intended size, a pair of rollers 20 is driven, to unwind material web 18 from supply roller 17, and unwound web 18 travels via feed funnel 22 to bale chamber 8, where it wraps around bale 16.

Cutting gap 21 is formed by a pivotably mounted knife 24 which extends across the entire width of supplied web 18, and a fixed rod 25, which serves as an anvil for knife 24. In a "ready" position, which is indicated with a dotted line, the knife is held by a pawl 26 and is pressed against rod 25 by a loaded spring 27. To separate material web 18, pawl 26 is released, so that knife 24 strikes rod 25. A swivel arm 28, on which knife 24 is mounted, falls into an open fork 29, which is mounted on a fourth rod of a second piston cylinder unit 30. This piston cylinder unit 30 is non-rotatably mounted on housing part 2.

Figure 2:
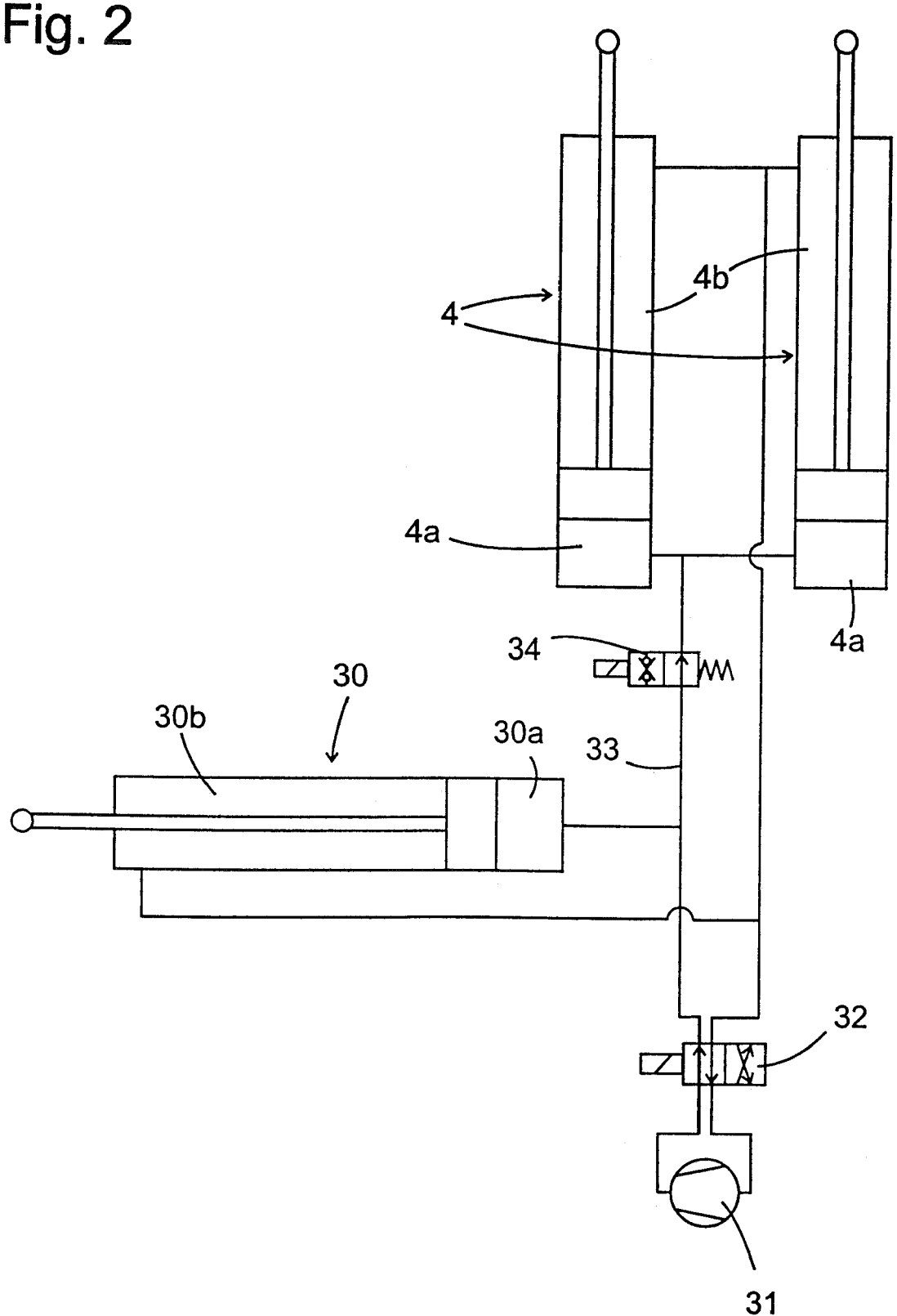
FIG. 2 shows part of the hydraulic system of the baler.

Piston cylinder units 4, 30 are part of a hydraulic system shown in FIG. 2. Piston cylinder units 4, 30 are double-acting and are supplied with hydraulic fluid by a pump 31 via a directional control valve 32. Piston cylinder unit 30 is connected directly with directional control valve 32; a further directional control valve 34 which is capable of blocking line 33 is located in a line 33 between piston cylinder units 4 and pump 31, and piston cylinder unit 30. Pump 31, directional control valves 32, 34, and pawl 26 are controllable by electrical control signals, which are supplied via a not-shown plug-and-socket connector. A control console, in particular, which is installed in the control station of a tractor attached to baler 1, can be connected to this plug-and-socket connector. A driver of the tractor can thereby control the piston cylinder units without having to leave the control station.

In the configuration shown in FIG. 2, pump 31 supplies chambers 4a, 30a of piston cylinder units, so that their piston rods are extended. In the case of piston cylinder units 4, this results in movable housing part 3 being swung open, by way of which bale 16 is ejected in a manner known per se. In the case of piston cylinder unit 30, the motion results in knife 24 being pressed back into pawl 26 against the force of spring 27.

When directional control valve 32 is now switched, the other chambers 4b, 30b are supplied with pressure fluid. As a result, the direction of motion of piston cylinder units 4, 30 reverses, the housing closes shut, and fork 29 returns to its position indicated in FIG. 1 with solid lines, while knife 24—held by pawl 26—remains in its "ready" position, which is indicated by dotted lines. Knife 24 is now ready to be released again.

When, after actuation of knife 24, an operator recognizes that the wrapping procedure failed, either because continuous web 18 wrapped around a roller instead of bale 16, or because bale 16 has not been wound tightly enough, he can move directional control valve 34 into the position in which it blocks line 33. When pump 31 is now actuated, only piston cylinder unit 30 extends and, as a result, the knife is pressed back into pawl 26; the housing of baler 1 remains closed. Another wrapping procedure can now be carried out without the operator having to try to reach knife 24 and reload it against the force of spring 27.

FIG. 2 shows a Y-shaped configuration of line 33, with three branches connected at a junction, on the ends of which are located pump 31, piston cylinder unit 4 and piston cylinder unit 30; directional control valve 34 is located between the junction and piston cylinder unit 4. A linear design of line 33 is also feasible, of course, with which piston cylinder units 4, 30 are located at one end of line 33, pump 31 is located in a central section of line 33, and directional control valve 34 is located between pump 31 and piston cylinder unit 4, or, with which piston cylinder unit 4 and pump 31 are located at an end of line 33, and piston cylinder unit 30 is located in a central section of line 33, and directional control valve 34 is located between piston cylinder units 4, 30.

It will be understood that each of the elements described above, or two or more together, may also find a useful application in other types of constructions differing from the type described above.

While the invention has been illustrated and described as embodied in a round baler, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A round baler, comprising a bale chamber; a movable flap for delivering a bale; a wrapping material dispenser for supplying wrapping material for wrapping a finished bale in said bale chamber; a knife movable from a ready position into a final position to separate a continuous web of the wrapping material between said dispenser and said bale chamber and returnable to the ready position; separate actuating elements assigned to said knife and to said flap; a common drive energy source; a line connecting said actuating elements to said common drive energy source; and an interrupter located in said line, wherein said drive energy source and said actuating element of said knife are located on one side of said interrupter, while said actuating element for said flap is located on another side of said interrupter.

2. The round baler as defined in claim 1, wherein said line is configured as a hydraulic line, while said interrupter is configured as a directional control valve.

3. The round baler as defined in claim 1, wherein said actuating element of said knife is drivable in two opposite direction, while said knife is driven by a motion of said actuator of said knife in a first of the two directions into the ready position.

4. The round baler as defined in claim 3; and further comprising a detent element for detachably locking said knife in the ready position.

5. The round baler as defined in claim 3, wherein said actuating element is movable into a second position while said knife is in the ready position.

6. The round baler as defined in claim 1, and further comprising drive means assigned to said knife, said drive means being configured as a spring.

7. The round baler as defined in claim 1, wherein said interrupter is configured as a remote-controlled interrupter.

* * * * *